United States Patent [19]

Yamaguchi et al.

[11] 4,420,532

[45] Dec. 13, 1983

[54] MAGNETIC RECORDING MEDIUM

[75] Inventors: Nobutaka Yamaguchi; Masaaki Fujiyama; Norio Nasu, all of Odawara, Japan

[73] Assignee: Fuji Photo Film Co., Ltd., Minami-ashigara, Japan

[21] Appl. No.: 364,181

[22] Filed: Mar. 31, 1982

[30] Foreign Application Priority Data

Mar. 31, 1981 [JP] Japan .................................. 56-46448

[51] Int. Cl.$^3$ ............................ G11B 5/70; B32B 5/16
[52] U.S. Cl. ................................. 428/329; 252/62.54; 252/62.59; 360/134; 360/135; 360/136; 427/128; 428/328; 428/331; 428/323; 428/694; 428/695; 428/900
[58] Field of Search ............... 428/695, 400, 694, 328, 428/329; 427/128; 252/62.54, 62.59; 360/134–136

[56] References Cited

U.S. PATENT DOCUMENTS

| | | | |
|---|---|---|---|
| 4,275,115 | 6/1981 | Naruse | 428/329 |
| 4,320,159 | 3/1982 | Ogawa et al. | 428/695 |
| 4,322,474 | 3/1982 | Matsuura et al. | 428/695 |

Primary Examiner—Ellis P. Robinson
Attorney, Agent, or Firm—Armstrong, Nikaido, Marmelstein & Kubovcik

[57] ABSTRACT

In a magnetic recording medium comprising a magnetic recording layer on the surface of a non-magnetic support member, a ferromagnetic powder, an abrasive having a Mohs' hardness of at least 6, colloidal silica and a fatty acid and fatty acid ester are incorporated in the magnetic layer, thus improving the durability of the magnetic layer and decreasing the head abrasion.

6 Claims, No Drawings

MAGNETIC RECORDING MEDIUM

BACKGROUND OF THE INVENTION

1. Field of the Invention

This invention relates to an improved magnetic recording medium and more particularly, it is concerned with a magnetic recording medium having an improved coating durability as well as a decreased head abrasion.

2. Description of the Prior Art

In order to improve the abrasion resistance of a coating film in a magnetic recording medium, it has hitherto been conducted to add abrasive particles having a large Mohs' hardness to the magnetic layer, but this method has the drawback that the abrasion of a magnetic head is increased, although the durability of the coating is improved. Furthermore, in order to improve the abrasion resistance of a magnetic layer and the abrasion suppressing action of a magnetic head, there has been proposed a magnetic recording medium having a non-magnetic powder with a Mohs' hardness of at least 9 and granular $\alpha$-$Fe_2O_3$, which still shows, however, an insufficient durability of magnetic layer.

SUMMARY OF THE INVENTION

It is an object of the present invention to provide a magnetic recording medium whereby the above described drawbacks of the prior art can be overcome.

It is another object of the present invention to provide a magnetic recording medium having an improved durability of the coating film, in particular, even at a low temperature.

It is a further object of the present invention to provide a magnetic recording medium capable of giving a decreased head abrasion and a long still life even after repeated use.

These objects can be attained by a magnetic recording medium comprising a magnetic recording layer on the surface of a non-magnetic support, in which the magnetic recording layer contains (i) a ferromagnetic powder, (ii) an abrasive having a Mohs' hardness of 6 or more, (iii) a non-magnetic powder, colloidal $SiO_2$, and (iv) a fatty acid and fatty acid ester.

DETAILED DESCRIPTION OF THE INVENTION

In accordance with the present invention, there is provided a magnetic recording medium comprising a magnetic recording layer on the surface of a non-magnetic support member, characterized in that the magnetic recording layer contains:

(i) at least one of magnetic powders,
(ii) at least one of abrasives with a Mohs' hardness of at least 6
(iii) colloidal silica and
(iv) at least one each of fatty acids and fatty acid esters Useful examples of the ferromagnetic powder which can be used in the present invention are, for example, $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$ ($FeO_x$: $1.33 < X < 1.50$), Co-doped Berthollide compounds of $\gamma$-$Fe_2O_3$ and $Fe_3O_4$($FeO_x$: $1.33 < X < 1.50$), $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973; U.S. Pat. Nos. 3,026,215, 3,031,341 3,100,194, 3,242,005, 3,389,014; British Pat. Nos. 752,659 and 1,007,323; French Pat. No. 1,107,654 and West German PLs No. 1,281,334.

The ferromagnetic powder has a particle size of about 0.2 to 1 micron in length with a length to width ratio of about 1/1 to 20/1.

Typical abrasive agents which can be used in the present invention include fused alumina, silicon carbide, chromium oxide, corundum, synthetic corundum, diamond, synthetic diamond, garnet, emergy (predominant component: corundum and magnetite) and the like, which have a Mohs' hardness of 6 or more, preferably 8 or more. These abrasive agents have generally a mean particle size of 0.05 to 5 microns, preferably 0.1 to 2 microns and are generally added in a proportion of 1 to 10 parts by weight to 100 parts by weight of the magnetic powder. Examples of the abrasives are described in Japanese Patent Application No. 26749/1973; U.S. Pat. Nos. 3,007,807, 3,041,196, 3,293,066, 3,630,910 and 3,687,725; British Pat. No. 1,145,349; and West German Pat. No. 853,211.

Non-magnetic powder, colloidal silica, is preferably added to the magnetic powder in a proportion of 5 to 50% by volume.

As the fatty acid, there is generally used at least one of saturated or unsaturated fatty acids having 6 to 22 carbon atoms, preferably 12 to 18 carbon atoms in a proportion of 0.1 to 2% by weight to the magnetic powder. Examples of the fatty acid are capric acid, lauric acid, myristic acid, oleic acid, stearic acid, erucic acid and behenic acid.

As the fatty acid ester, there is generally used at least one of fatty acid esters having a melting point of 60° C. or lower, preferably 40° C. or lower in a proportion of 0.1 to 2% by weight. Examples of the fatty acid ester are methyl stearate, ethyl stearate, butyl stearate, amyl stearate, butyl palmitate, butyl myristate, oleyl oleate and butyl laurate.

Production of the magnetic recording medium of the present invention can be carried out in conventional manner blending the foregoing four components with a binder, coating solvent and other additives such as abrasives, dispersing agents, lubricants, antistatic agents, etc., kneading, coating onto a non-magnetic support and then subjecting to a surface forming treatment.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylatevinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, mixtures of high molecular weight polyester resins and isocyanate prepolymers, mixtures of methacrylic acid salt copolymers and diisocyanate prepolymers, mixtures of polyester polyols and polyisocyanates, urea-formaldehyde resins, mixtures of low molecular weight glycols, high molecular weight diols and triphenylmethane triisocyanates, polyamine resins and mixtures thereof. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc.

These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide and tungsten disulfide.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as higher alkylamines, quaternary ammonium salts, heterocyclic compounds, e.g. pyridine and the like; phosphoniums, sulfoniums and the like; anionic surface active agents containing acid groups such as carboxylic acid groups, sulfonic acid groups, phosphoric acid groups, sulfate groups, phosphate groups and the like; and amphoteric surface active agents such as sulfates or phosphates of amino acids, aminosulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLs) No. 1,942,665, British Pat. Nos. 1,077,317 and 1,198,450, Ryohei Oda et al., "Kaimen Kassei Zai no Gosei to sono Oyo" (Synthesis of Surface Active Agents and Their Applications), Maki Shoten, Tokyo (1964), A. M. Schwarts et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran" (Handbook of Surface Active Agents), 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving the dispersibility, magnetic properties and lubricity, or as an auxiliary coating agent.

Formation of a magnetic recording layer is carried out by dissolving the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc., and non-magnetic metals, for example, copper, alluminum, zinc, etc.

Such a non-magnetic support has a thickness of about 3 to 100 microns, preferably 5 to 50 microns in the form of a disk or card. In the case of a drum form, its type is determined according to a recorder to be used.

The above described magnetic powder, binder, additives and solvent are well blended or kneaded to prepare a magnetic coating composition. For kneading, the magnetic powder and other component are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition.

Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku" (Coating Engineering), page 253 to 277, published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol, and the like; esters such as methyl acetate, ethyl acetate, butyl acetate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene choloride, carbon tetrachloride, chloroform, ethylene chlorohydrin, dichlorobenzene and the like; etc.

The magnetic recording medium of the present invention has the following merits:

(1) The durability of a coating film at a low temperature is excellent.
(2) The head abrasion at a low temperature is decreased.
(3) Damages (Breakage, scratch) of a head are suppressed.
(4) Since a lubricant is constantly fed from the magnetic layer to a head, touch of the tape to the head is held well, thus making smooth the tape running property in a VTR running system and giving a good image quality.

the present invention will be explained in detail with reference to the following examples. It will be obvious to one skilled in the art that various changes and modifications can be made in components, ratio, operational order and the like without departing from the spirit of the present invention. Therefore, the present invention should not be construed as being limited to the following examples.

EXAMPLES

A coating liquor having the following composition was prepared, coated onto a polyethylene terephthalate base having a thickness of microns, subjected to a surface finishing treatment and then slit to obtain a magnetic tape of ¾ inch in width for U-matic VTR.

|  | Parts by weight |
|---|---|
| Co-doped $\gamma$-$Fe_2O_3$ | 100 |
| Vinyl Chloride-Vinyl Acetate-Maleic Acid Copolymer | 12 |
| Polyester type polyurethane | 15 |
| Polyisocyanate | 7 |
| Carbon Black | 5 |
| Chromium Oxide ($Cr_2O_3$) | A |
| Colloidal $SiO_2$ (Aerosil R-972-Commercial Name manufactured by Nippon Aerosil Co.) | B |
| Stearic Acid | C |
| Amyl Stearate Ester | D |
| Butyl Acetate | 250 |

As to samples of the present invention and comparative examples obtained by varying the amounts A, B, C and D and using $Cr_2O_3$ and other abrasives in the above described recipe, the still lives at a low temperature (5° C.) and room temperature and the head abrasion were measured to obtain results shown in the following table, in which numerals represented parts by weight:

| | | | | Measured at 5° C. | | Measured at Room Temperature | | |
|---|---|---|---|---|---|---|---|---|
| | | | | | | Still Life after 100 | Initial Still | |
| | Abrasive $Cr_2O_3$ with Mohs' hardness of 8–9, A | Colloidal $SiO_2$ B | Stearic Acid/ Amyl Stearate C/D | Initial Still Life (min) | Head Abrasion ($\mu$m/100 hr) | runnings in VTR at 5° C. (min) | Life at Room Temp. (min) | Head Abrasion at Room Temp. ($\mu$m/100 hr) |
| Example | | | | | | | | |
| 1 | 1.5 | 9 (20 vol %) | 1/1 | 120 or more | 2 | 120 or more | 120 or more | 2 |
| 2* | 1.5 | 9 (20 vol %) | 0/0 | 3 | 8 | 1 or less | 10 | 3 |
| 3* | 1.5 | 0 | 1/1 | 80 | 10 | 2 | 120 or more | 4 |
| 4* | 1.5 | 0 | 0/0 | 2 | 9 | 1 or less | 10 | 6 |
| 5* | 0 | 9 (20 vol %) | 1/1 | 5 | 2** | (4*) | 2.5 | 2 |
| 6* | 0 | 9 (20 vol %) | 0 | 2 | 1** | (4*) | 1 or less | 2 |
| 7* | 0 | 0 | 1/1 | 5 | (5*) | (4*) | 12 | (4*) |
| 8* | 0 | 0 | 0 | 1 | (5*) | (4*) | 1 or less | (4*) |
| 9* | 2 granular $\alpha$-$Fe_2O_3$ 4 | 0 | 0/0 | 2 | 8 | 1 or less | 40 | 5 |
| 10* | 2 granular $\alpha$-$Fe_2O_3$ 4 | 0 | 0/0.8 | 30 | 8 | 3 | 80 | 6 |
| 3* | 1.5 | 0 | 1/1 | 80 | 10 | 2 | 120< | 4 |
| 11 | 1.5 | 2.25 (5 vol %) | 1/1 | 120< | 4 | 50 | 120< | 3 |
| 12 | 1.5 | 4.5 (10 vol %) | 1/1 | 120< | 3 | 80 | 120< | 2 |
| 1 | 1.5 | 9 (20 vol %) | 1/1 | 120< | 2 | 120< | 120< | 2 |
| 13 | 1.5 | 18 (40 vol %) | 1/1 | 120< | 4 | 120< | 120< | 2 |
| 14 | 1.5 | 22.5 (50 vol %) | 1/1 | 120< | 3 | 120< | 120< | 3 |
| 15 | 1.5 | 36 (80 vol %) | 1/1 | 120< | 6 | 120< | 120< | 4 |
| 16 | 0 | 9 (20 vol %) | 1/1 | 40 | 2 | 20 | 60 | 2 |
| 17 | MgO 1.5, 6** | 9 (20 vol %) | 1/1 | 120< | 2 | 120< | 120< | 2 |
| 1 | 1.5, 8–9** | 9 (20 vol %) | 1/1 | 120< | 2 | 120< | 120< | 2 |
| 18 | $\alpha$-$Al_2O_3$ 1.5, 9** | 9 (20 vol %) | 1/1 | 120< | 3 | 120< | 120< | 1.5 |
| 19 | SiC 1.5, 9** | 9 (20 vol %) | 1/1 | 120< | 3 | 120< | 120< | 2.5 |
| 20 | 8 | 9 | 1/1 | 120< | 3.5 | 120< | 120< | 3.5 |

-continued

| Example | Abrasive Cr$_2$O$_3$ with Mohs' hardness of 8-9, A | Colloidal SiO$_2$ B | Stearic Acid/ Amyl Stearate C/D | Measured at 5° C. Initial Still Life (min) | Measured at 5° C. Head Abrasion (μm/100 hr) | Measured at Room Temperature Still Life after 100 runnings in VTR at 5° C. (min) | Measured at Room Temperature Initial Still Life at Room Temp. (min) | Measured at Room Temperature Head Abrasion at Room Temp. (μm/100 hr) |
|---|---|---|---|---|---|---|---|---|
| 21 | 1.5 | 9 | 1/1 (oleic acid/amyl stearate) | 120< | 2 | 120< | 120< | 2 |
| 22 | 1.5 | 9 | 1/1 (myristic acid/amyl stearate) | 120< | 2 | 120< | 120< | 2 |
| 23 | 1.5 | 9 | 1/1 (lauric acid/amyl stearate) | 120< | 2.3 | 120< | 120< | 2 |

Note:
*Comparative Example
**Mohs' Hardness
***Magnetic layer tends to be scraped and measurement is not correct.
(4*)Durability is not good.
(5*)Magnetic layer is scraped and measurement is impossible.
Sample No. 15 shows that the coating surface property is somewhat inferior and the video sensitivity and video S/N are lowered by 1.5 dB.

As can be seen in this table, the magnetic tapes according to the present invention show a longer still life and excellent durability even under severe conditions, e.g. at a low temperature such as 5° C., in addition to the case of at room temperature, and even after running at 5° C. 100 times in VTR. Moreover, the head abrasion is stably little not only at room temperature and but also at a low temperature and the head life can be held longer.

Sample Nos. 2 to 8 which do not have the combination of the additives of the present invention is inferior to the present invention with respect to the above described properties.

Sample Nos. 9 and 10, corresponding to comparative examples according to the prior art, are inferior to the present invention as to still life and head abrasion and, in particular, markedly different therefrom as to durability at low temperatures.

In view of Sample Nos. 1, 3 and 11 to 15, it will be understood that the quantity of colloidal silica is preferably within a range of 5 to 50% to the magnetic substance so as to obtain balanced excellent properties.

In view of Sample Nos. 16 to 19, it is apparent that even when using other abrasive particles than Cr$_2$O$_3$, there are given good properties if they have a Mohs' hardness of at least 6.

What is claimed is:

1. A magnetic recording medium comprising a magnetic recording layer on the surface of a non-magnetic support, in which the magnetic recording layer contains (i) a ferromagnetic powder, (ii) 1 to 10% by weight based on the weight of the ferromagnetic powder of an abrasive having a Mohs' hardness of at least 6, (iii) 5 to 50% by volume based on the volume of the ferromagnetic powder of colloidal silica and (iv) 0.1 to 2% by weight based on the weight of the ferromagnetic powder of a saturated or unsaturated fatty acid having 6 to 22 carbon atoms and 0.1 to 2% by weight based on the weight of the ferromagnetic powder of a fatty acid ester having a melting point of at most 60° C.

2. The magnetic recording medium of claim 1, wherein the ferromagnetic powder is selected from the group consisting of fine powder of γ-Fe$_2$O$_3$, Co-doped γ-Fe$_2$O$_3$, Fe$_3$O$_4$, Co-doped Fe$_3$O$_4$, Berthollide compounds of γ-Fe$_2$O$_3$ and Fe$_3$O$_4$, Co-doped Berthollide compounds of γ-Fe$_2$O$_3$ and Fe$_3$O$_4$, CrO$_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

3. The magnetic recording medium of claim 1, wherein the abrasive having a Mohs' hardness of at least 6 is selected from the group consisting of fused alumina, silicon carbide, chromium oxide, corundum, synthetic corundum, diamond, synthetic diamond, garnet and emery.

4. The magnetic recording medium of claim 1, wherein the abrasive has a mean particle size of 0.05 to 5 microns.

5. The magnetic recording medium of claim 1, wherein the saturated or unsaturated fatty acid is selected from the group consisting of capric acid, lauric acid, myristic acid, oleic acid, stearic acid, erucic acid and behenic acid.

6. The magnetic recording medium of claim 1, wherein the fatty acid having a melting point of at most 60° C. is selected from the group consisting of methyl stearate, ethyl stearate, butyl stearate, amyl stearate, butyl palmitate, butyl myristate, oleyl oleate and butyl laurate.

* * * * *